(12) United States Patent
Makin et al.

(10) Patent No.: US 12,240,516 B2
(45) Date of Patent: Mar. 4, 2025

(54) BRAKE OPERATING ARRANGEMENT

(71) Applicant: LOADHOG LIMITED, Sheffield (GB)

(72) Inventors: John Makin, Sheffield (GB); Luke Davis, Sheffield (GB); Martin Baker, Sheffield (GB)

(73) Assignee: LOADHOG LIMITED (GB)

( * ) Notice: Subject to any disclaimer, the term of this patent is extended or adjusted under 35 U.S.C. 154(b) by 572 days.

(21) Appl. No.: 17/615,615

(22) PCT Filed: Jun. 24, 2020

(86) PCT No.: PCT/IB2020/055955
§ 371 (c)(1),
(2) Date: Dec. 1, 2021

(87) PCT Pub. No.: WO2020/261130
PCT Pub. Date: Dec. 30, 2020

(65) Prior Publication Data
US 2022/0242472 A1    Aug. 4, 2022

(30) Foreign Application Priority Data

Jun. 27, 2019 (GB) ..................................... 1909220
Jun. 23, 2020 (GB) ..................................... 2009537

(51) Int. Cl.
*B62B 5/04*    (2006.01)
*B62B 5/00*    (2006.01)

(52) U.S. Cl.
CPC .......... *B62B 5/0485* (2013.01); *B62B 5/0093* (2013.01); *B62B 5/0433* (2013.01)

(58) Field of Classification Search
None
See application file for complete search history.

(56) References Cited

U.S. PATENT DOCUMENTS 1,633,638 A * 6/1927 Jarvis .................... B60B 33/021
                                                        188/74
2007/0051565 A1* 3/2007 Chen ....................... B62B 9/087
                                                        188/19

FOREIGN PATENT DOCUMENTS

| DE | 202010012390 U1 | 12/2010 | |
|---|---|---|---|
| DE | 202014105034 U1 | 2/2015 | |
| DE | 202016005705 U1 | 11/2016 | |
| EP | 2662262 A2 | 11/2013 | |
| FR | 2200123 A1 | 4/1974 | |
| GB | 2043549 A | 10/1980 | |
| GB | 2108605 A * | 5/1983 | ............. A61G 5/101 |

* cited by examiner

Primary Examiner — Melanie Torres Williams
(74) Attorney, Agent, or Firm — Clark Hill PLC; James R. Foley (57) ABSTRACT

A brake operating arrangement (18) comprises a cam member (22) operable on a brake mechanism (36) for braking a wheel (34). The brake mechanism (36) is movable between a braking condition and a non-braking condition. The cam member (22) is rotatable to move the brake mechanism (36) to the braking condition. The brake operating arrangement (18) further includes a drive member (44) movable in drive and return directions; and a ratchet mechanism (46) to rotate the cam member (22) when the drive member (44) is moved in the drive direction. The ratchet mechanism (46) is connected to the drive member (44) and the cam member (22).

21 Claims, 8 Drawing Sheets

BRAKE OPERATING ARRANGEMENT

This invention relates to brake operating arrangements. Embodiments of this invention relate to brake operating arrangements for use in dollies. This invention relates to dollies incorporating brake operating arrangements.

Embodiments of this invention relate to brake operating arrangements for use in trolleys. This invention relates to trolleys incorporating brake operating arrangements.

This invention also relates to brake assemblies. Embodiments of this invention relate to brake assemblies for use in dollies. This invention relates to dollies incorporating brake assemblies.

Embodiments of this invention relate to brake assemblies for use in trolleys. This invention relates to trolleys incorporating brake assemblies.

Published PCT application No. WO 2008/017798 discloses a dolly that can be converted to a pallet by moving bearers downwardly to engage the ground. The dolly includes a complex arrangement of toggle links and beams to move the bearers. Many businesses do not require such complexity and would like to be able to use a simpler less expensive apparatus.

According to one aspect of this invention, there is provided a brake operating arrangement comprising:
- a cam member operable on a brake mechanism for braking a wheel, the brake mechanism being movable between a braking position and a non-braking position, wherein the cam member is rotatable to move the brake mechanism to the braking position;
- a drive member movable in drive and return directions; and a ratchet mechanism to rotate the cam member when the drive member is moved in the drive direction, the ratchet mechanism being connected to the drive member and the cam member.

According to another aspect of this invention, there is provided a brake assembly comprising:
- a brake mechanism for braking a wheel, the brake mechanism being movable between a braking position and a non-braking position; and
- a brake operating assembly as described above.

According to another aspect of this invention, there is provided a brake assembly comprising:
- a brake mechanism for braking a wheel, the brake mechanism being movable between a braking position and a non-braking position;
- a cam member rotatable to move the brake mechanism to the braking position; a drive member movable in drive and return directions; and
- a ratchet mechanism to rotate the cam member when the drive member is moved in the drive direction, the ratchet mechanism being connected to the drive member and the cam member.

According to another aspect of this invention there is provided a method of using a brake operating arrangement as described above, said method comprising moving the drive member in the drive direction, thereby causing the ratchet mechanism to rotate the cam member to move the brake mechanism to the braking position.

According to another aspect of this invention there is provided a method of using a brake assembly as described above, said method comprising moving the drive member in the drive direction, thereby causing the ratchet mechanism to rotate the cam member to move the brake mechanism to the braking position.

The brake mechanism may comprise a braking member. The braking member may be movable between braking and non-braking positions. The braking member may engage the wheel when the braking member is in the braking position.

When the brake mechanism is in the braking condition, the braking member may be in the braking position. When the brake mechanism is in the non-braking condition, the braking member may be in the non-braking position.

When the brake mechanism is in the braking position, the braking member may be in the braking position. When the brake mechanism is in the non-braking position, the braking member may be in the non-braking position.

The brake mechanism may further include a brake release spring for moving the brake mechanism to the non-braking position.

The method may comprise moving the drive member in the drive direction to rotate the ratchet mechanism, thereby rotating the cam member.

The cam member may be rotatable between a force applying condition and a release condition. In the force applying condition, the cam member may apply a force to the braking member to maintain the braking member in the braking position.

In the release condition, the braking member may be in the non-braking position. Rotation of the ratchet mechanism by the drive member may rotate the cam member between the force applying condition and the release condition.

The brake mechanism may include a transmission element for transmitting a force applied by the cam member to the braking member to move the braking member to the braking position. The braking member and the transmission element may constitute a brake.

The cam member may have a force applying region. When the cam member is in the force applying condition, the force applying region may engage the transmission element.

The cam member may have a release region. When the cam member is in the release condition, the release region may engage the transmission element.

The cam member may be rotated by moving the drive member in the drive direction to move the force applying region into engagement with the braking member and move the braking member to the braking position.

The cam member may be rotated by moving the drive member in the drive direction to move the release region into engagement with the braking member and move the braking member to the non-braking position.

The cam member may have a plurality of force applying regions and a plurality of release regions. The force applying regions and the release regions may be arranged alternately relative to each other.

When the cam member is in the force applying condition, one of the force applying regions may engage the brake mechanism. When the cam member is in the release condition, one of the release regions may engage the brake mechanism.

The cam member may have three of the force applying regions and three of the release regions. The, or each, force applying region may comprise a force applying surface.

The, or each, release region may comprise a release surface. The, or each, force applying surface may be a radially outwardly facing force applying surface. The, or each, release surface may be a radially outwardly facing release surface.

The cam member may be rotatable about an axis of rotation of the cam member. The, or each, force applying surface may be spaced from the axis of rotation of the cam member by a greater distance than the, or each, release surface.

The cam member may be rotated by moving the drive member in the drive direction to move one of the force applying regions into engagement with the brake mechanism and move the braking member to the braking position.

The cam member may be rotated by moving the drive member in the drive direction to move one of the release regions into engagement with the brake mechanism and move the braking member to the non-braking position.

One of the force applying regions may engage the transmission element and move the braking member to the braking position. One of the release regions may engage the transmission element and move the braking member to the non-braking position.

The ratchet mechanism may be arranged between the cam member and the drive member. The ratchet mechanism may prevent rotation of the cam member when the drive member moves in the return direction.

The ratchet mechanism may prevent rotation of the cam member when the drive member moves in the return direction and the brake mechanism is held in the braking position.

The ratchet mechanism may comprise a propelling member connected to the drive member. The ratchet mechanism may comprise a propelled member capable of being propelled by the propelling member.

The propelling member may be rotatable to rotate the propelled member about an axis of rotation of the ratchet mechanism.

When the drive member is rotated in the drive direction, the propelling member may rotate the propelled member. When the drive member is rotated in the return direction, the propelling member may rotate relative to the propelled member.

The method may comprise moving the drive member in the drive direction to cause the propelling member to rotate the propelled member. The method may comprise moving the drive member in the return direction to cause the propelling member to rotate relative to the propelled member.

Each of the propelling member and the propelled member may comprise a respective rotatable main part. The propelling member and the propelled member may be rotatable about the axis of rotation.

Each of the propelling member and the propelled member may comprise a plurality of teeth. The teeth may extend axially from the respective main part. The teeth may extend in a substantially circular configuration on the respective main part.

Each tooth of the plurality of teeth may be asymmetric, having an axially extending drive surface. The drive surface may be parallel to the axis of rotation of the ratchet arrangement. The axis of rotation of the ratchet mechanism may constitute the axis of rotation of the cam member.

Each of said teeth may include a return surface sloping relative to the drive surface. When the drive member is moved in the return direction, the teeth of the propelling member may slide along the return surface of the teeth of the propelled member.

The ratchet mechanism may be connected to the cam member so that rotation of the ratchet mechanism rotates the cam member between the force applying conditions and the release conditions.

The propelled member may be fixedly connected to the cam member so that rotation of the ratchet mechanism rotates the cam member between the force applying conditions and the release conditions.

The brake operating arrangement may comprise a shaft connecting the ratchet mechanism to the cam member. The propelled member may be fixedly mounted on the shaft so that rotation of the propelled member rotates the shaft. Thus, rotation of the propelled member is transferred by the shaft to the cam member.

The drive member may be rotatable relative to the shaft. The brake operating arrangement may include a bearing member on the shaft. The bearing member may support the drive member and allow the aforesaid rotation of the drive member relative to the shaft.

The ratchet mechanism may include a resilient urging member for urging the propelling member and the propelled member into meshing engagement with each other. The urging member may urge one of the propelling member and the propelled member into engagement with the other of the propelling member and the propelled member. The urging member may engage the propelled member to urge the propelled member onto the propelling member.

The urging member may extend along the shaft. A reaction member may be provided on the shaft to provide a reaction force to the urging member. The reaction member may be fixedly mounted on the shaft.

The reaction member may comprise a bush through which the shaft extends. The urging member may extend between the propelled member and the reaction member.

The brake operating arrangement may comprise two of the cam members. The brake assembly may comprise two of the braking members, each braking member being movable between respective braking and non-braking positions. Each cam member may be rotatable to move a respective one of the braking members to its braking position.

The drive member may be connected to both cam members by the ratchet mechanism when the drive member moves in the drive direction. Both of the cam members may be attached to the shaft. The drive member may be disposed between the cam members.

The drive member may comprise a lever. In one embodiment, the drive member may comprise a foot pedal.

The wheel may be part of a wheel assembly. The wheel assembly may comprise the wheel and a holding arrangement for holding the wheel. The holding arrangement may comprise a frame.

The wheel assembly may comprise the brake mechanism. The brake release spring may be arranged between the holding arrangement and the brake mechanism.

According to another aspect of this invention, there is provided a wheeled carrier comprising a body, a plurality of wheels, and a brake assembly as described above operable on the wheels.

The wheeled carrier may comprise a wheeled platform. The wheeled carrier may comprise a dolly.

Embodiments of the invention will now be described by way of example only with reference to the accompanying drawings, in which.

Figure 1:
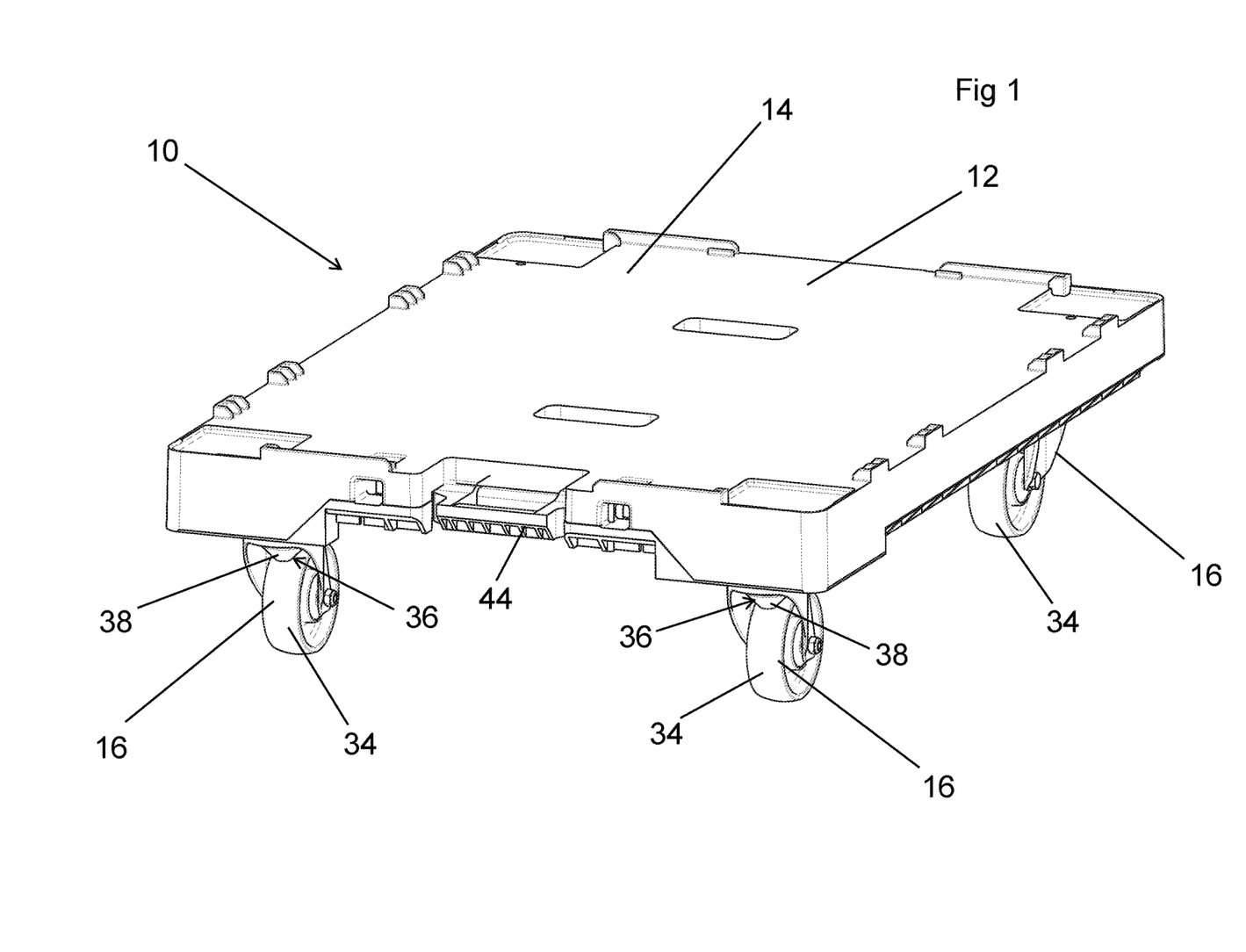
FIG. 1 is a view of a wheeled carrier comprising a body and a plurality of wheels.

FIG. 1 shows a wheeled carrier in the form of a dolly 10, which comprises a body 12 providing a platform 14 for supporting a load. The dolly 10 further includes wheel assemblies in the form of four casters 16. The casters 16 are arranged in two pairs: a first pair 16A at one end of the body 12, and a second pair 16B at the opposite end of the body 12.

Figure 2:
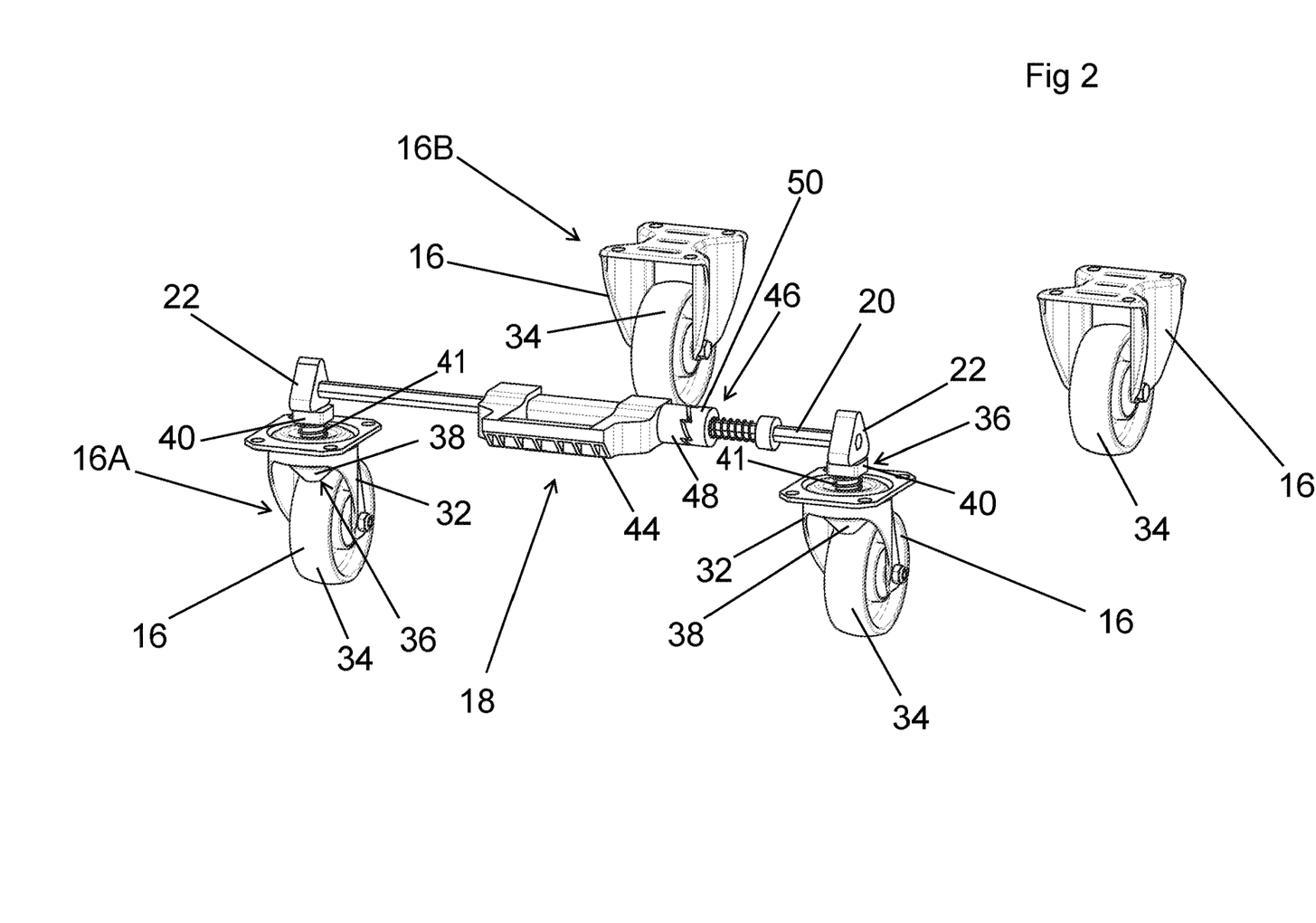
FIG. 2 is a view of the wheels and a brake operating arrangement of the wheeled carrier.

The first pair of casters 16A are connected to a brake operating arrangement 18 comprising a shaft 20 extending between the casters 16. A respective cam member 22 is provided at each of the opposite ends of the shaft 20. Each of the cam members 22 is secured on the shaft 20 by frictional engagement therewith.

Figures 6, 7:
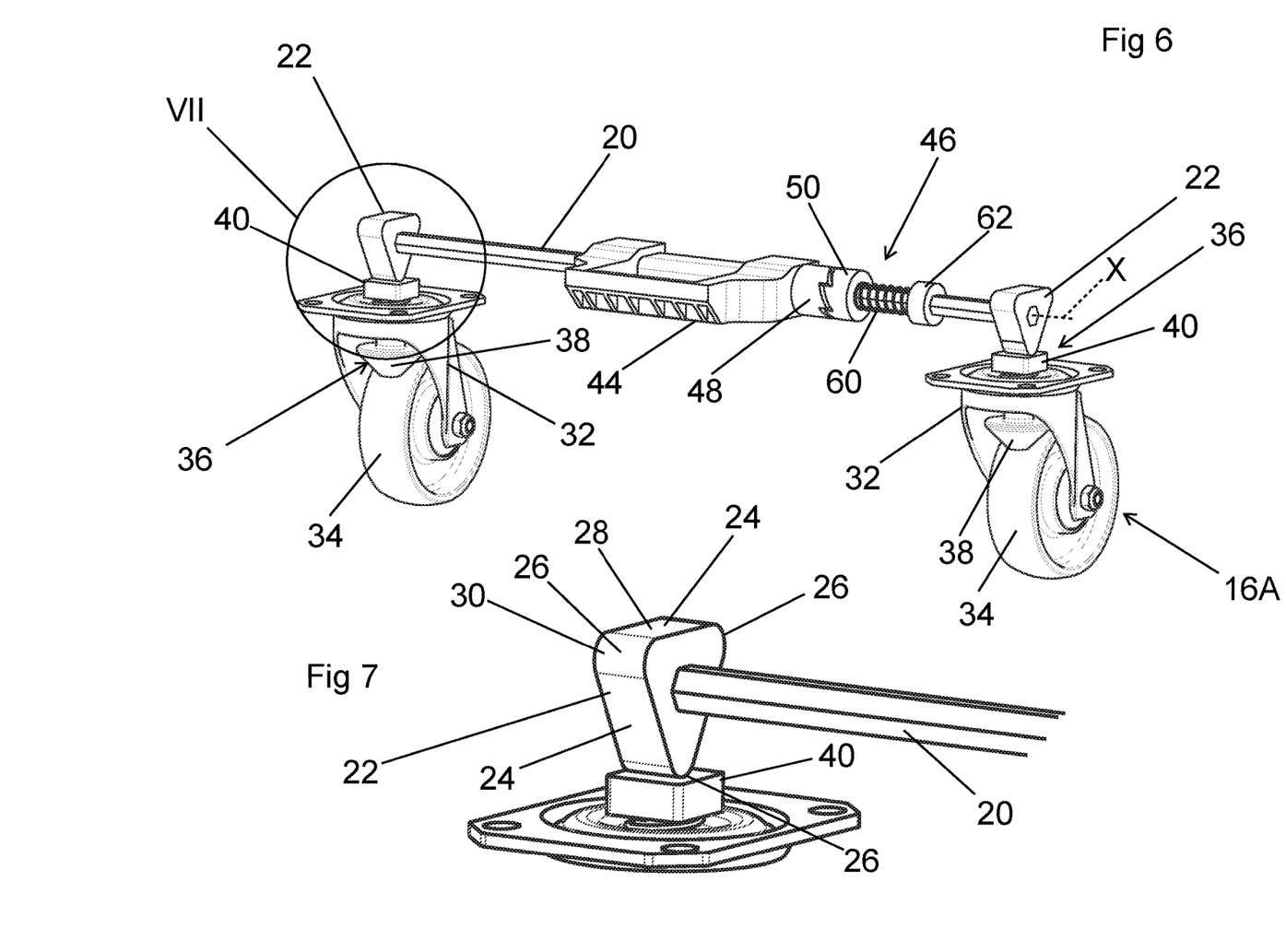
FIG. 6 shows a view similar to FIG. 3, in which the braking members are shown in braking positions after the drive member is moved in a return direction.
FIG. 7 is a close up view of the region marked VII in FIG. 6.

Referring to FIG. 7, the cam member 22 has alternating force applying regions 26 and release regions 24. Each force applying region 26 has a radially outwardly facing force applying surface 30, and each release region 24 has a radially outwardly facing release surface 28. The force applying regions and surfaces 26, 30, and the release regions and surfaces 24, 28 are described in more detail below.

In the embodiment shown, the cam member 22 has three force applying regions 26 and three release regions 24. The force applying regions 26 and the release regions 24 alternate relative to each other. It will be appreciated that the cam member could have any other suitable number of alternating force applying regions 26 and release regions 24, such as four or five.

Figures 3, 4:
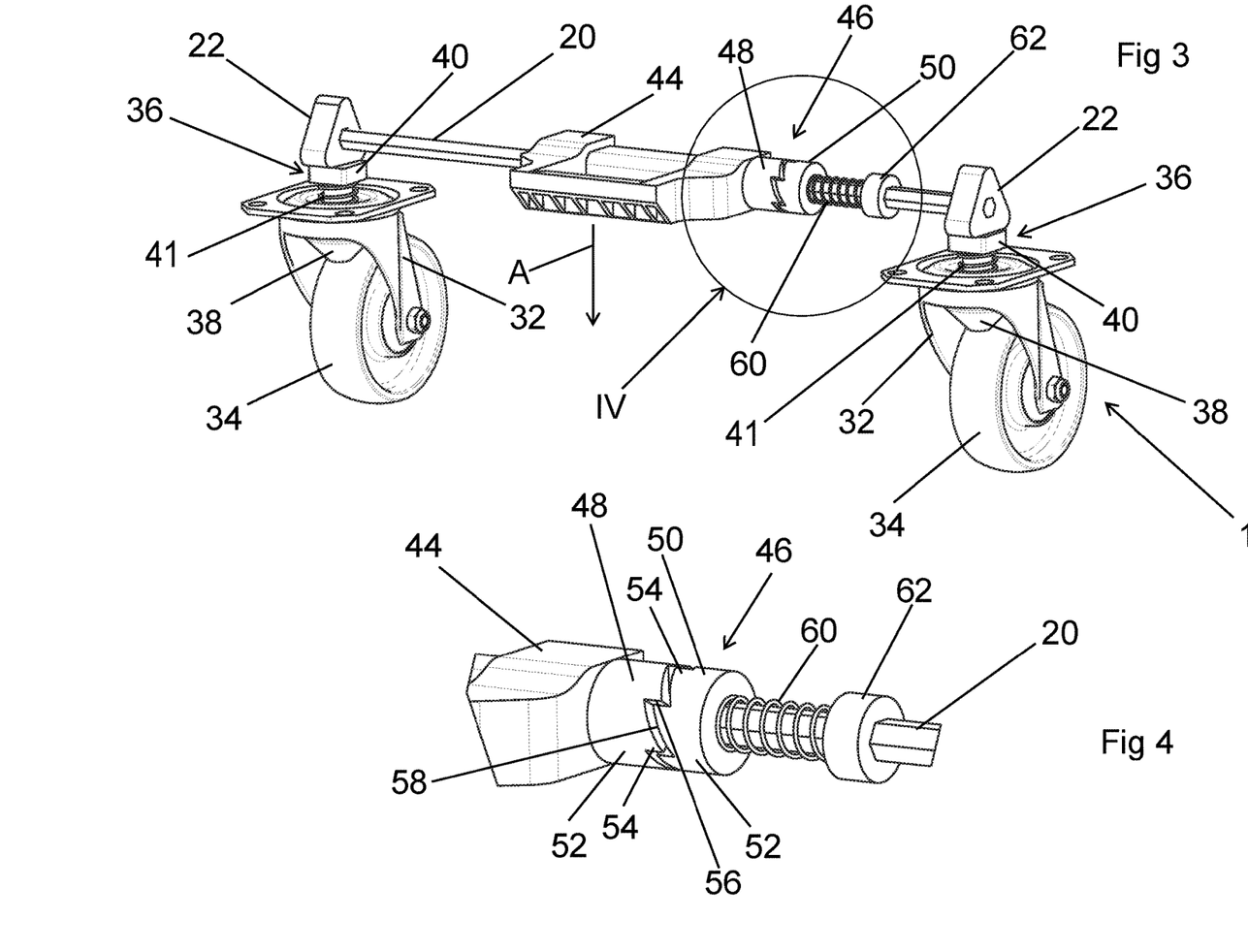
FIG. 3 is a view of the brake operating arrangement and two wheels of the wheeled carrier, in which braking members are shown in non-braking positions.
FIG. 4 is a close up view of the region marked IV in FIG. 3.

Each caster 16 comprises a holding arrangement 32, in the form of a frame, and a wheel 34 rotatably held by the holding arrangement 32. Each caster 16 includes a brake mechanism 36 comprising a braking member 38, a transmission element 40, and a brake release spring 41. The combination of the brake operating arrangement 18 and the brake mechanism 36 is referred to herein as a brake assembly.

The braking member 38 is movable between a braking position, in which the braking member 38 engages the wheel 34, and a non-braking position in which the braking member 38 is spaced from the wheel 34. The brake release spring 41 is arranged between the holding arrangement 32 and the braking member 38 to urge the braking member 38 to the non-braking position.

The transmission element 40 extends from the braking member 38. A force can be applied by the cam member 22 to the transmission element 40 in the direction of the braking member 38.

Figure 5:
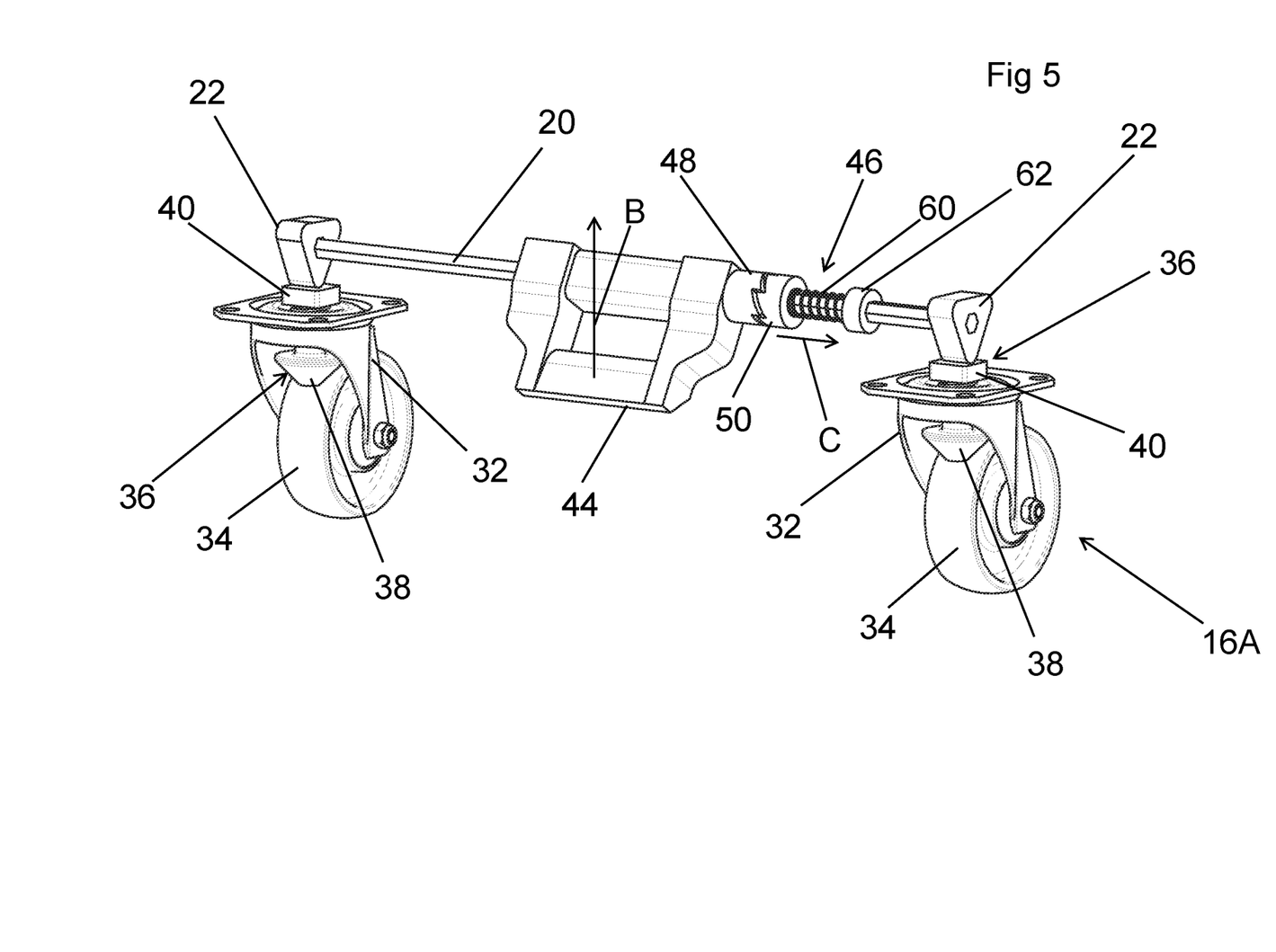
FIG. 5 shows a view similar to FIG. 3, in which the braking members are shown in braking positions after a drive member is moved in a drive direction.

The force is applied when the cam member 22 moves to a force applying condition in which one of the force applying surfaces 30 engages the transmission element 40. The force so applied is transmitted by the transmission element 40 to the braking member 38 to move the braking member 38 to the braking position.

The cam member 22 can be moved to a release condition. In the release condition, one of the release surface 28 engages the transmission element 40, thereby allowing the transmission element 40 to move towards the shaft 20, and the braking member 38 to move to the non-braking position.

Each cam member 22 and the shaft 20 are rotatable about an axis of rotation X extending longitudinally through the shaft 20. The force applying surfaces 30 are a greater distance from the axis of rotation X than the release surfaces 28.

The brake mechanism 36 further includes a drive member 44 in the form of a lever which, in the embodiment shown, comprises a foot pedal. The drive member 44 may float on the shaft 20, without engagement therewith other than by means of a ratchet mechanism 46 discussed below. Alternatively, the drive member 44 is rotatably mounted on the shaft 20 by suitable bearings, thereby enabling the drive member 44 to rotate about the bearings. Each bearing may be similar to the bush forming the reaction member 62 discussed below.

The drive member 44 is connected to the shaft 20 by a ratchet mechanism 46. The drive member 44 can be pressed in the direction indicated by the arrow A in FIG. 3, so that it rotates in a drive direction from its position shown in FIG. 3 to its position shown in FIG. 5. The movement of the drive member 44 in the drive direction is indicated by the arrow A in FIG. 3. This downward movement of the drive member 44 is transmitted by the ratchet mechanism 46 to the shaft 20, thereby rotating the shaft 20.

The drive member 44 is also rotatable in a return direction from the position shown in FIG. 5 to the position shown in FIG. 6 (which shows the same position of drive member 44 as FIG. 3). The movement of the drive member 44 in the return direction is indicated by the arrow B in FIG. 5.

The ratchet mechanism 46 comprises a cylindrical propelling member 48 fixedly attached to the drive member 44. The shaft 20 extends through an aperture in the propelling member 48, the aperture being large enough to allow rotation of the propelling member 48 relative to the shaft 20. Thus, the propelling member 48 rotates with the drive member 44 around the shaft 20 when the drive member 44 rotates in the drive and return directions.

The ratchet mechanism 46 also includes a propelled member 50 attached to the shaft 20. The propelled member 50 is attached to the shaft 20 so that the propelled member 50 can move linearly along the shaft 20. The propelled member 50 is rotatably fixed to the shaft 20 so that the shaft 20 is rotated when the propelled member 50 rotates.

The ability of the propelled member 50 to rotate the shaft 20 is effected by providing the shaft 20 with a hexagonal end profile, and by providing the propelled member 50 with a correspondingly shaped and sized hexagonal aperture through which the shaft 20 extends.

Each of the propelling and propelled members 48, 50 is rotatable about the axis of rotation X.

Referring to FIG. 4, the propelling and propelled members 48, 50 have respective main portions 52. Teeth 54 are arranged on each of the main portions 52 around the axis of rotation X.

The teeth 54 of each of the propelling and propelled members 48, 50 are directed towards each other so that they mesh to allow the propelling member 48 to propel the propelled member 50.

Each tooth 54 of the plurality of teeth 54 is asymmetric, having an axially extending drive surface 56. The drive surface 56 extends parallel to the axis of rotation X. Each of tooth 54 also includes a return surface 58 sloping relative to the drive surface 56.

When the drive member 44 is moved in the return direction, the teeth 54 of the propelling member 48 slide along the return surfaces 58 of the teeth 54 of the propelled member 50.

The ratchet mechanism 46 further includes an urging member 60, in the form of a compression spring, in engagement with the propelled member 50. A reaction member 62 in the form of a bush is provided on the shaft 20 adjacent the propelled member 50. The reaction member 62 is secured on the shaft 20 by frictional engagement therewith.

The reaction member 62 is rotationally and linearly fixed to the shaft 20, so that the reaction member 62 cannot move linearly along the shaft 20, and rotates with the shaft 20 when the shaft 20 rotates.

The urging member 60 extends between the reaction member 62 and the propelled member 50. Thus, the urging member 60 urges the propelled member 50 onto the propelling member 48.

The urging member 60 can be attached to the propelled member 50 and the reaction member 62. This attachment can be effected by means of projecting members each opposite end of the urging member 60. The projecting members are received in respective holes in the propelled member 50 and the reaction member 62. When the drive member 44 is pressed in the direction of the arrow A in FIG. 3, the urging member 60 is resiliently twisted from an untwisted position to a twisted position. On releasing the drive member 44, the urging member 60 returns to its untwisted position, thereby moving the drive member 44 in the return direction as indicated by the arrow B in FIG. 5.

When the propelled member 50 is so urged, the teeth 54 on the main portion 52 of the propelling member 48 mesh with the teeth 54 on the main portion 52 of the propelled member 50.

The meshing of the teeth 54 has the effect that rotation of the propelling member 48 by the drive member 44 causes the propelling member 48 to rotate the propelled member 50.

Rotation of the propelled member 50 effects rotation of the shaft 20 in the same direction, thereby effecting rotation of the cam members 22.

When the cam member 22 is in the release condition and the drive member 44 is in the position shown in FIG. 3, the teeth 54 of the propelled member 50 are meshed with the teeth 54 of the propelling member 48.

Rotation of the drive member 44 in the drive direction, shown by the arrow A in FIG. 4, causes the propelling member 48 to rotate the propelled member 50 in the same direction as the arrow A, thereby rotating the cam member 22 in the same direction.

As a result, the cam member 22 rotates to the force applying position, pressing the transmission element 40 downwards. This moves the braking member 38 to the braking position in engagement with the wheel 34.

The user may then lift his or her foot off the drive member 44, to allow the resilient urging member 60 to rotate the drive member 44 in the return direction, shown by the arrow B in FIG. 5.

The rotation of the drive member 44 in the return direction causes the teeth 54 of the propelling member 48 to move over the teeth 54 of the propelled member 50, thereby urging the propelled member 50 along the shaft 20 in the direction of the arrow C. Thus, the urging element moves the drive member 44 to its resting position shown in FIG. 6.

In order to move the braking member to the non-braking position, it is necessary to move the cam member 22 to the release condition. This is done by the user again pressing down on the drive member 44, thereby rotating it in the drive direction.

Rotating the drive member 44 in the drive direction rotates the cam member 22 in the same direction, thereby moving the cam member 22 to the release condition so that the release region 24 engages the transmission element 40.

When the cam member 22 is moved to the release condition, the transmission element 40 and the braking member 38 move upwardly, urged by the brake release spring 41.

The user can then lift his or her foot off the drive member 44, thereby allowing the drive member 44 to move back to its resting position so that the teeth 54 of the propelling member 48 slide along the return surfaces 58 of the propelled member 50. The release condition of the cam member 22 and the resting position of the drive member 44 are shown in FIG. 3.

There is thus described a dolly 10 with a brake operating arrangement 18 that can operate a brake mechanism 36, moving it between braking and non-braking positions by pressing downwardly on the pedal. A ratchet mechanism 46 is provided to enable the aforesaid movement.

Various modifications can be made without departing from the scope of the invention.

Figure 8:
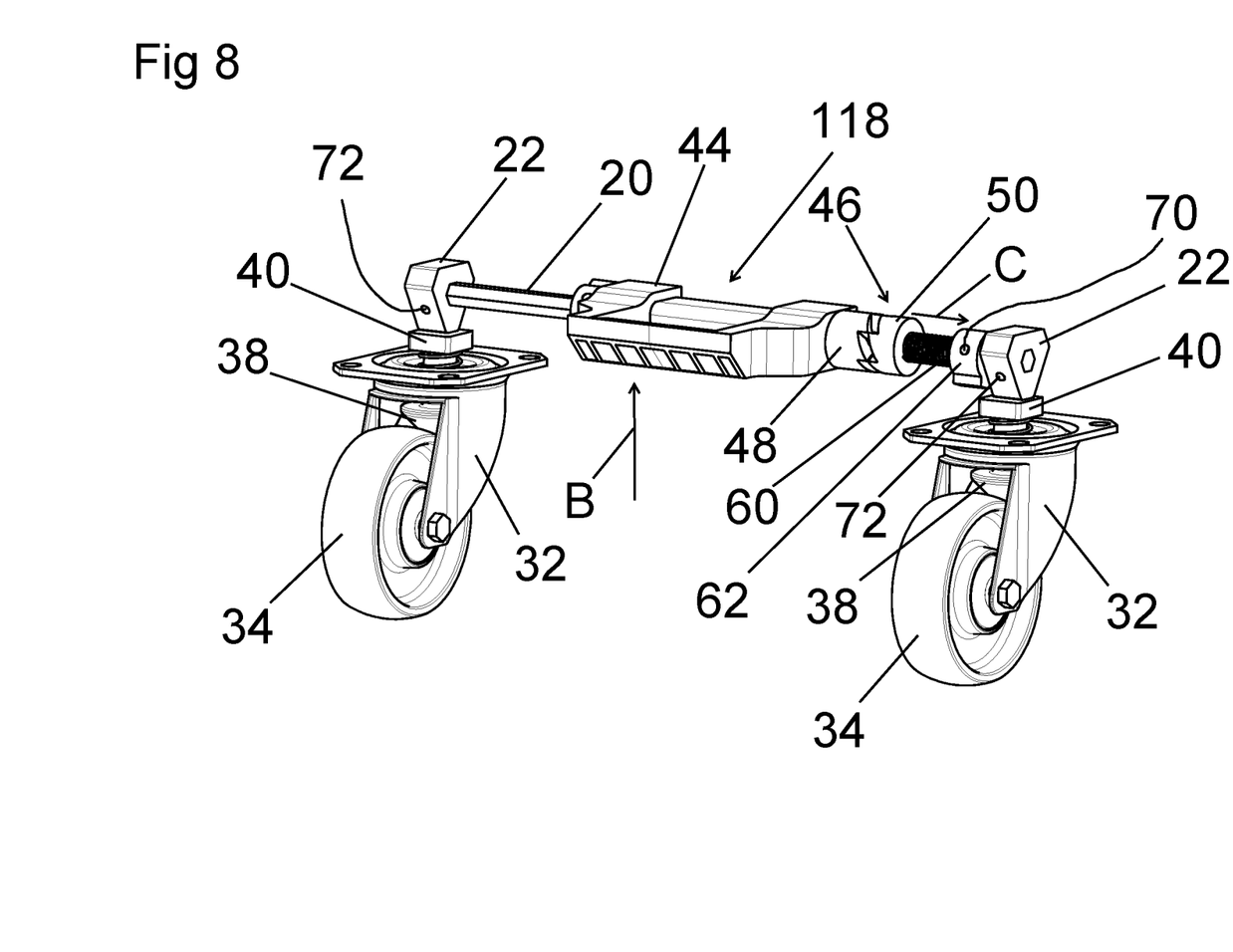
FIG. 8 is a view from a first direction of a further brake operating arrangement of the wheeled carrier, in which the drive member is moving in a return direction.
Figure 9:
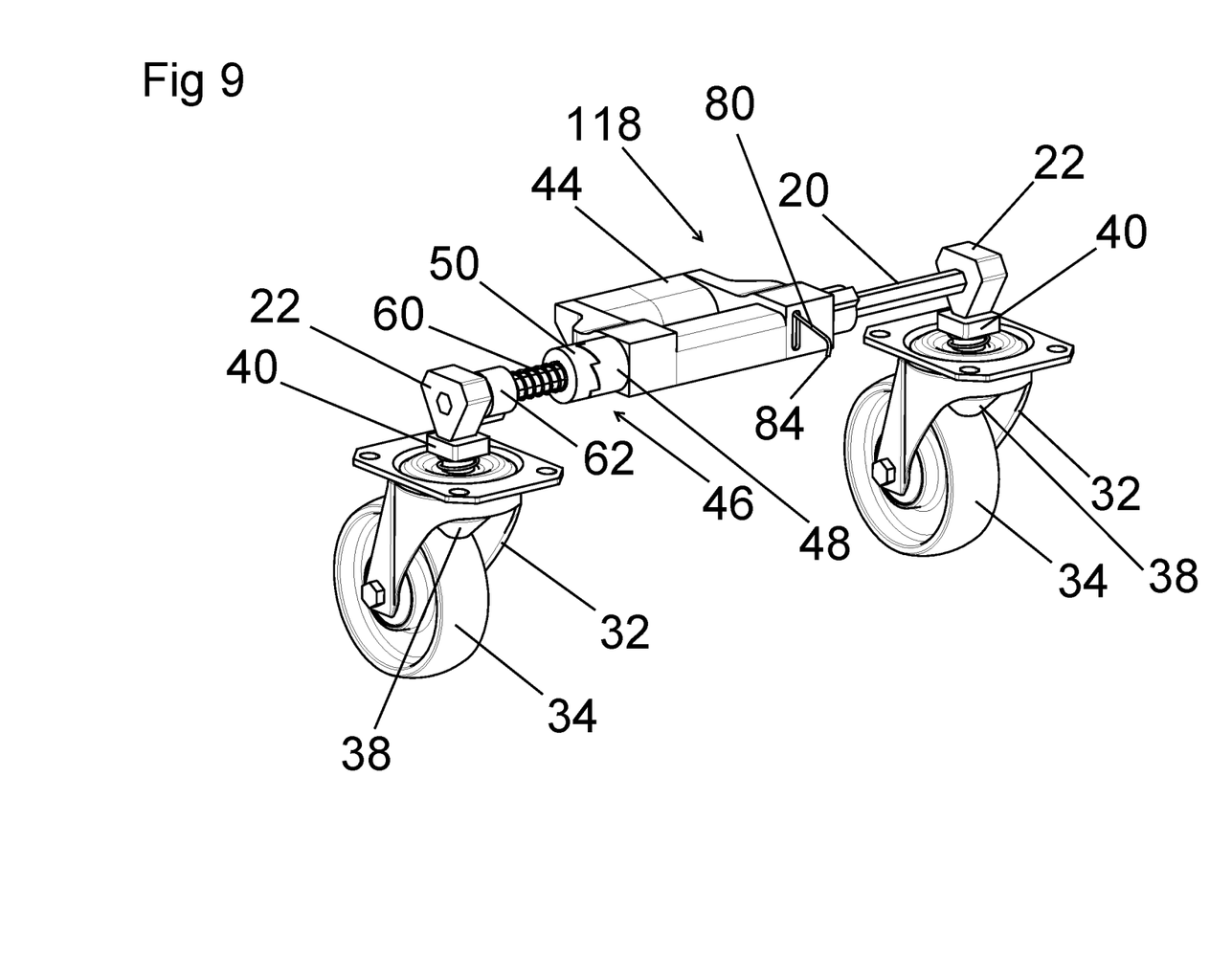
FIG. 9 is a view from a second direction of the further brake operating arrangement.
Figure 10:
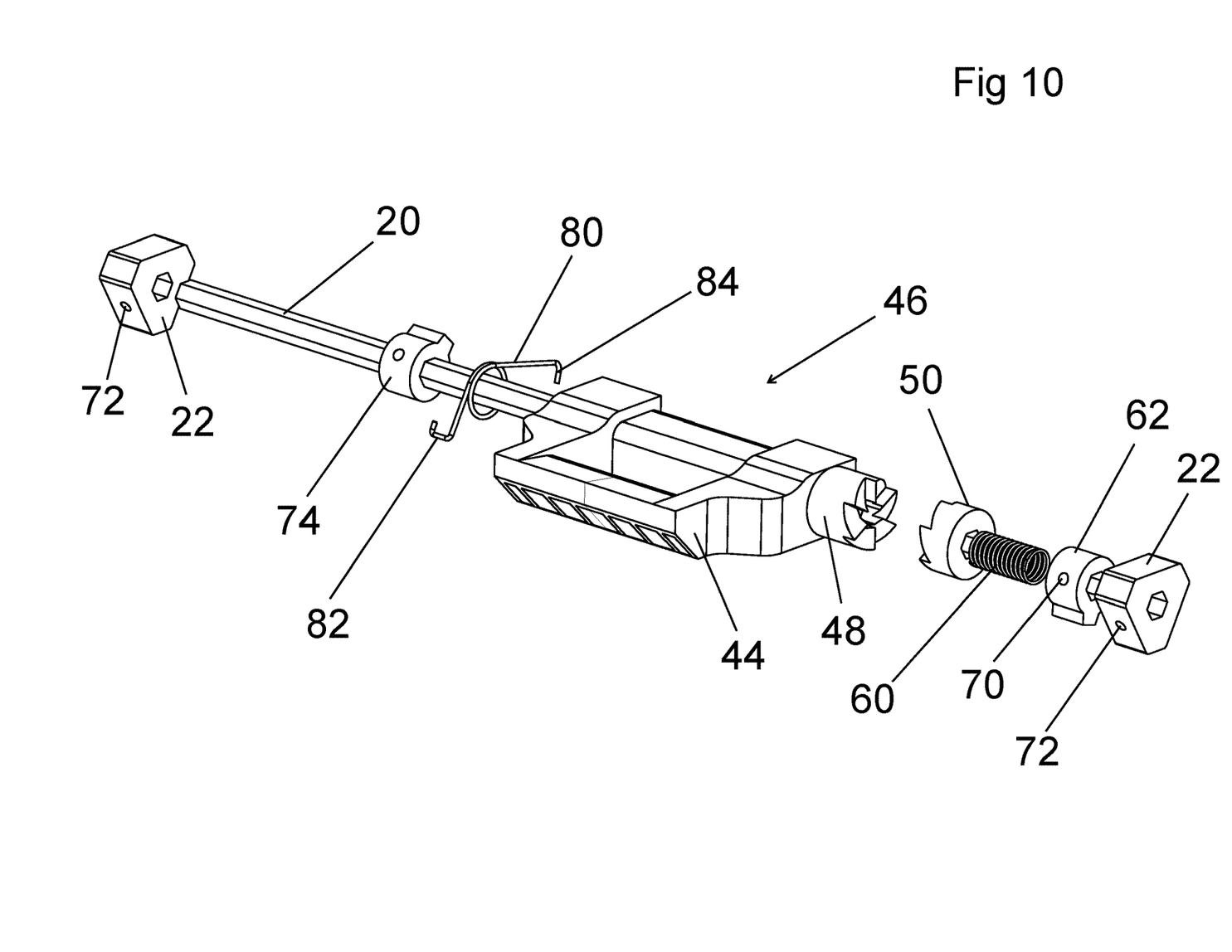
FIG. 10 is an exploded view of the further brake operating arrangement.

A further brake operating arrangement 118 is shown in FIGS. 8 to 10. The further brake arrangement 118 comprises many of the features of the brake arrangement 18 shown in FIGS. 1 to 7. These features are designated in FIGS. 8 to 10 with the same reference numerals as the corresponding features in FIGS. 1 to 7.

The further brake operating arrangement 118 differs from the brake operating arrangement 18 in that the reaction member 62 and the cam members 22 of the brake operating arrangement 118 is secured to the shaft 20 by means of a grub screw tightened against the shaft 20 through threaded apertures 70, 72 in the reaction member 62 and the cam members 22.

The further brake arrangement 118 additionally includes a locking member 74 to lock the drive member 44 in a central position on the shaft 20. The drive member 44 is urged by the urging member 60 into engagement with the locking member 74. The locking member 74 is secured to the shaft 20 by a grub screw which is screwed through a threaded aperture 78 into engagement with the shaft 20.

The brake arrangement 118 further includes a return spring 80 to return the drive member 44 in the direction indicated by the arrow B in FIG. 8. The return spring 80 extends around the shaft 20, and has projections 82, 84 at the opposite ends. The projection 82 is received by a suitable formation in the drive member 44. The projection 84 is received by a suitable formation in the body 12. Thus, after the drive member 44 has been depressed and released, the return spring 80 urges the drive member 44 in the direction indicated by the arrow B in FIG. 8.

As the drive member 44 moves in the direction indicated by the arrow B, the interaction of the teeth 54 of the propelling member 48 and the propelled member 50 causes the propelled member 50 to be pushed in the direction indicated by the arrow C in FIG. 8. This movement of the propelled member 50 compresses the spring 60, as shown in FIG. 8, thereby urging the drive member 44 against the locking member 74. The return spring 80 also urges the teeth 54 of the propelled member 50 into meshing engagement with the teeth 54 of the propelling member 48 when the drive member 44 has fully returned in the direction indicated by the arrow B.

The invention claimed is:

1. A brake operating arrangement comprising:
a cam member operable on a brake mechanism for braking a wheel, the brake mechanism being movable between a braking position and a non-braking position, wherein the cam member is rotatable to move the brake mechanism to the braking position;
a drive member movable in drive and return directions; and a ratchet mechanism to rotate the cam member when the drive member is moved in the drive direction, the ratchet mechanism being connected to the drive member and the cam member;
wherein the cam member is rotatable between a force applying condition and a release condition, whereby when the cam member is in the force applying condition, the cam member applies a force to the brake mechanism to maintain the brake mechanism in the braking position;
wherein the cam member has a force applying region to apply said force, and the force applying region comprises a radially outwardly facing force applying surface.

2. A brake operating arrangement according to claim 1, wherein when the cam member is in the release condition, the brake mechanism is in the non-braking position.

3. A brake operating arrangement according to claim 2, wherein the cam member has a plurality of the force applying regions and a plurality of release regions, the force applying regions and the release regions being arranged alternately relative to each other, whereby when the cam member is in the force applying condition, one of the force applying regions engage the brake mechanism, and when the cam member is in the release condition, one of the release regions engages the brake mechanism.

4. A brake operating arrangement according to claim 3, wherein the brake mechanism comprises a braking member movable between braking and non-braking positions, and the cam member is rotated by moving the drive member in the drive direction to move the force applying region into engagement with the braking member and move the braking member to the braking position, and wherein the cam member is rotated by moving the drive member in the drive direction to move the release region into engagement with the braking member and move the braking member to the non-braking position.

5. A brake operating arrangement according to claim 3, wherein each, release region comprises a radially outwardly facing release surface.

6. A brake operating arrangement according to claim 3, wherein the cam member is rotatable by moving the drive member in the drive direction to move one of the force applying regions into engagement with the brake mechanism and move the brake mechanism to the braking position, and wherein the cam member is rotatable by moving the drive member in the drive direction to move one of the release regions into engagement with the brake mechanism and move the brake mechanism to the non-braking position.

7. A brake operating arrangement according to claim 1, wherein the brake operating arrangement comprises two of the cam members, both of the cam members being attached to the shaft, the drive member being disposed between the cam members, the drive member being connected to both cam members by the ratchet mechanism when the drive member moves in the drive direction.

8. A brake operating arrangement comprising:
a cam member operable on a brake mechanism for braking a wheel, the brake mechanism being movable between a braking position and a non-braking position; wherein the cam member is rotatable to move the brake mechanism to the braking position;
a drive member movable in drive and return directions; and a ratchet mechanism to rotate the cam member when the drive member is moved in the drive direction, the ratchet mechanism being connected to the drive member and the cam member;
wherein the ratchet mechanism is arranged between the cam member and the drive member, the ratchet mechanism preventing rotation of the cam member when the drive member moves in the return direction.

9. A brake operating arrangement according to claim 8, wherein the ratchet mechanism comprises a propelling member connected to the drive member, and the ratchet mechanism further comprises a propelled member capable of being propelled by the propelling member.

10. A brake operating arrangement according to claim 9, wherein the propelling member is rotatable to rotate the propelled member about an axis of rotation of the ratchet mechanism, whereby when the drive member is rotated in the drive direction, the propelling member rotates the propelled member, and when the drive member is rotated in the return direction, the propelling member rotates relative to the propelled member.

11. A brake operating arrangement according to claim 9, wherein each of the propelling member and the propelled member comprise a respective rotatable main part, and each of the propelling member and the propelled member comprise a plurality of teeth, the teeth extending axially from the respective main part.

12. A brake operating arrangement according to claim 11, wherein each tooth of the plurality of teeth may be asymmetric, having an axially extending drive surface, said drive surface being parallel to the axis of rotation of the ratchet arrangement, and each of said teeth includes a return surface sloping relative to the drive surface, whereby when the drive member is moved in the return direction, the teeth of the propelling member slide along the return surface of the teeth of the propelled member.

13. A brake operating arrangement according to claim 12, wherein the brake operating arrangement comprises a shaft connecting the ratchet mechanism to the cam member, the propelled member being fixedly mounted on the shaft so that rotation of the propelled member rotates the shaft.

14. A brake operating arrangement according to claim 13, wherein the drive member is rotatable relative to the shaft, and the brake operating arrangement includes a bearing member on the shaft, the bearing member supporting the drive member and allowing the aforesaid rotation of the drive member relative to the shaft.

15. A brake operating arrangement according to claim 9, wherein the ratchet mechanism includes a resilient urging member for urging the propelling member and the propelled member into meshing engagement with each other.

16. A brake operating arrangement according to claim 15, wherein the urging member extends along the shaft, and a reaction member is provided on the shaft to provide a reaction force to the urging member, the urging member extending between the propelled member and the reaction member.

17. A brake assembly comprising: a braking operating arrangement as claimed in claim 1 and said brake mechanism.

18. A brake assembly according to claim 17, wherein the brake mechanism comprises a braking member movable between braking and non-braking positions, the braking member engaging the wheel when the braking member is in the braking position, whereby when the brake mechanism is in the braking position, the braking member is in the braking position, and when the brake mechanism is in the non-braking position, the braking member is in the non-braking position.

19. A brake assembly according to claim 18, wherein the brake mechanism comprises a transmission element for transmitting a force applied by the cam member to the braking member to move the brake mechanism to the braking position, and the brake mechanism includes a brake release spring for moving the brake mechanism to the non-braking position.

20. A brake assembly according to claim 18, wherein the brake assembly comprises two of the braking members, each braking member being movable between respective braking and non-braking positions, and the brake operating arrangement comprises two of the cam members, each cam member being rotatable to move a respective one of the braking members to its braking position.

21. A brake operating arrangement for use with a brake mechanism, the brake mechanism comprising a braking member movable between a braking position and a non-braking position, wherein the brake operating arrangement comprises:

a cam member operable on the brake mechanism, wherein the cam member is rotatable to move the braking member to the braking position;

a drive member movable in drive and return directions; and a ratchet mechanism to rotate the cam member when the drive member is moved in the drive direction, the ratchet mechanism being connected to the drive member and the cam member;

wherein the cam member is rotatable between a force applying condition and a release condition, whereby when the cam member is rotated to the force applying condition, the cam member can apply a force to the braking member to maintain the braking member in the braking position;

wherein the cam member has a force applying region, and the cam member is rotatable by moving the drive member in the drive direction to move the force applying region into engagement with the braking member and to move the braking member to the braking position; and the force applying region comprises a force applying surface, wherein the force applying surface is a radially outwardly facing force applying surface.

* * * * *